Nov. 2, 1943.　　　E. J. H. THIEMER　　　2,333,397
LIQUID LEVEL GAUGE
Filed May 24, 1941
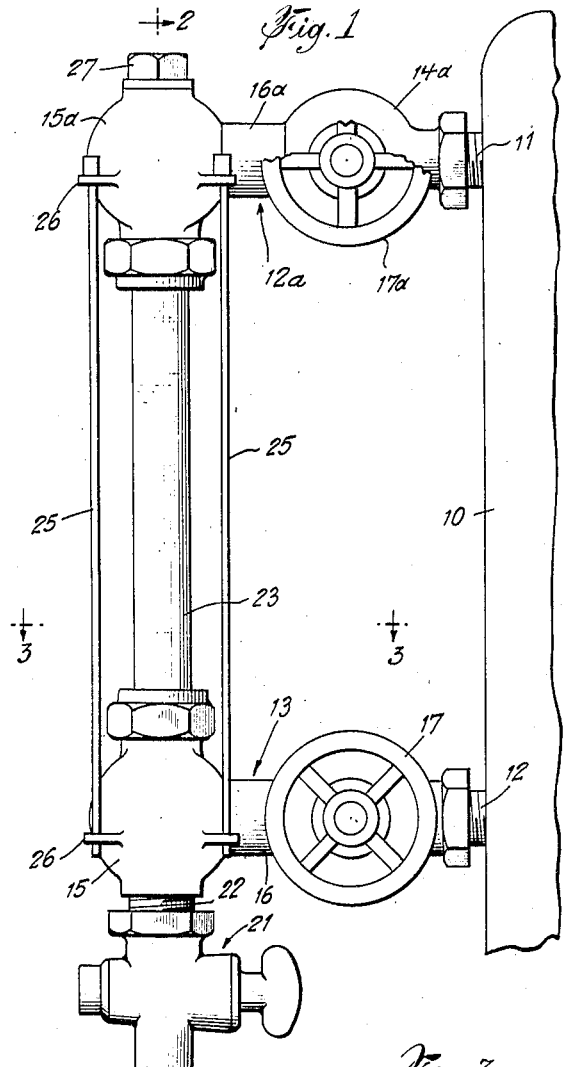
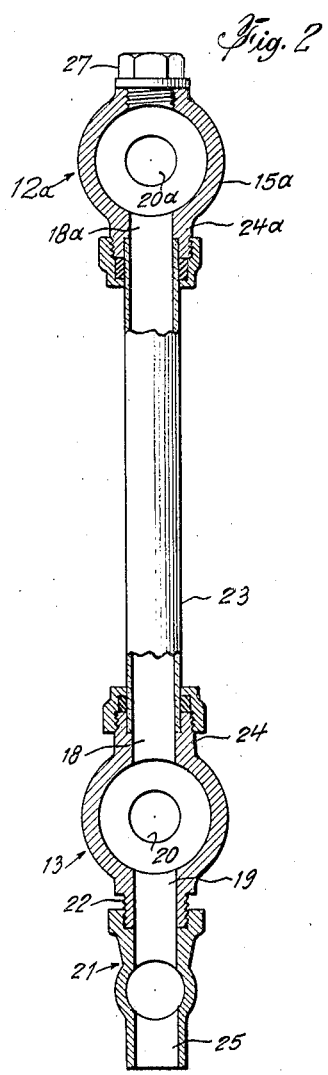
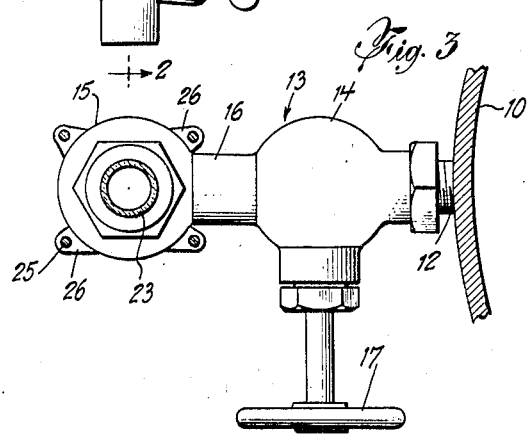
INVENTOR.
E. J. H. THIEMER
BY
F. Ledermann
ATTORNEY

Patented Nov. 2, 1943

2,333,397

UNITED STATES PATENT OFFICE 2,333,397

LIQUID LEVEL GAUGE

Edmund J. H. Thiemer, Brooklyn, N. Y.

Application May 24, 1941, Serial No. 394,980

1 Claim. (Cl. 73—332)

This invention relates to liquid level gauges for all purposes and devices such as, for example, steam and hot water boilers, and has for its object the provision of useful and practical improvements therein whereby the gauge glass may be readily cleaned as often as desired without having to dismantle the gauge and remove the glass.

Once a gauge glass has been placed in proper position and been made leaf-proof, it is undesirable to remove it for any purpose because of the difficulty of replacing it in a leak-proof condition, yet the usual glass cannot in most cases be cleaned without removing it. The common way of cleaning the glass without dismantling it, as is done sometimes with boiler gauges, is to cause an acid solution such as hydrochloric acid to be sucked up into the glass. That method is objectionable, however, because the acid bites into the glass surface and gives it a cloudy appearance so as to impair its transparency. The glass is of course fragile, and in the operation of tightening it against the packing at both ends by means of the usual adjustment nuts, the glass frequently breaks. In the course of time all gauge glasses become discolored by the boiler water or other liquid entering the same, by the formation of films of the liquid which cling to the glass, and eventually the discoloration is so great that the true level cannot be readily read, thus necessitating the installation of a new glass. Furthermore, for a period of time prior to replacement of the old glass, there is always the danger of a misreading of the true level because of the discolored glass, thus needlessly risking the danger of damage because of a too low or too high liquid level in the receptacle.

By means of the present invention, the gauge glass may be easily cleaned as often as desired without requiring dismantling of the glass, and in a very simple and rapid manner, thus adding life to the glass and assuring a clear and correct reading of the true level at all times.

The above and other objects will become apparent in the description below, wherein reference numerals refer to like-numbered parts in the accompanying drawing.

Referring briefly to the drawing,

Figure 1 is a side elevational view of a liquid level gauge, showing fragmentarily the receptacle or container to which it is attached.

Figure 2 is a cross-sectional view taken on the line 2—2 of Figure 1.

Figure 3 is a cross-sectional view taken on the line 3—3 of Figure 1.

Referring in detail to the drawing, the numeral 10 indicates the liquid receptacle and the numerals 11 and 12 the upper and lower gauge attachment nipples, respectively. The numerals 12a and 13 indicate, respectively, the upper and lower unitary pipe and valve members which are screwed onto their respective nipples 11 and 12a.

The unitary member 13 comprises a valve housing 14 and a globular glass support 15 joined by a neck 16. The valve 14, with its handle 17, is the usual type of simple valve whereby the passage through the same may be opened or closed. The globe 15 is hollow and is provided with two aligned vertical openings 18 and 19 and one lateral opening 20 which communicates with the neck 16 leading to the valve 14. A petcock 21 is screwed on to the nipple 22 extending from the globe opening 19, and the gauge glass 23 rests in a flange formed within the nipple 24 surrounding the globe opening 18. The member 12a is identical to the member 13, and similar parts thereof are indicated in the drawing by the same reference numeral followed by the letter "a." The usual support rods 25 are supported in ears 26 on the globes 15 and 15a. The upper opening in the globe 15a is closed by a plug 27.

It is to be noted that the opening through the petcock 21 is substantially similar to that through the nipples 22 and 24, for example, say, three-eighths of an inch. This permits insertion of a brush, of the type used to clean ice box drain pipes, up through the petcock 21 (when opened) and into the glass 23, whereby the glass may be cleaned as often as desired with a minimum of effort. This is impossible with the usual construction wherein the valves, similar to the valves 14 and 14a, are situated at the top and bottom of the glass, as the valves even when fully opened do not permit insertion of a brush therethrough, due to the fact that the stem of each valve extends horizontally through the center of the globular member and obstructs the passage to the glass.

It is also to be noted that both units 12a and 13 are identical in all respects, which permits standardization of manufacture of the same for use either at the top or at the bottom of the gauge, by transposing the petcock and the plug, for either right-hand or left-hand installation, with the consequent advantage of simplifying the manufacture and keeping of stock and savings in costs.

Obviously, modifications in form and structure may be made without departing from the spirit and scope of the invention.

I claim:

In a liquid level gauge, a pair of mutually identical members adapted to be secured to the gauge outlet nipples of a liquid container, each of said members comprising a valve housing having valve means therein, said housing having opposed horizontal openings therethrough, a hollow globular housing having diametrically opposed vertical openings therethrough and a horizontal opening therethrough, and a pipe joining said horizontal opening of said globular housing and one of said openings through said valve housing, a gauge glass mounted between the opposed vertical openings of said globular housings, a plug sealing the upper vertical opening in the upper of said globular housings, a petcock attached to the lower of said openings in the lower of said globular housings, the openings through said petcock and the lower of said globular housings being in alignment with and of the same diameter as the opening through said glass, the continuous vertical passage from the bottom of said plug to the lower extremity of said petcock having at every horizontal level thereof a diameter at least equal to the diameter of said opening through said glass.

EDMUND J. H. THIEMER.